United States Patent
Dechamp

(10) Patent No.: US 8,798,860 B2
(45) Date of Patent: *Aug. 5, 2014

(54) DRIVE ASSISTING METHOD FOR REVERSAL PATH WITH DRAWN VEHICLE

(75) Inventor: Francois Dechamp, Cluny (FR)

(73) Assignee: Renault Trucks, Saint Priest (FR)

( * ) Notice: Subject to any disclaimer, the term of this patent is extended or adjusted under 35 U.S.C. 154(b) by 1520 days.

This patent is subject to a terminal disclaimer.

(21) Appl. No.: 11/993,038

(22) PCT Filed: Jun. 24, 2005

(86) PCT No.: PCT/FR2005/050493

§ 371 (c)(1),
(2), (4) Date: Aug. 1, 2008

(87) PCT Pub. No.: WO2006/136664

PCT Pub. Date: Dec. 28, 2006

(65) Prior Publication Data

US 2008/0312792 A1   Dec. 18, 2008

(51) Int. Cl.
| | |
|---|---|
| *B62D 12/02* | (2006.01) |
| *B62D 12/00* | (2006.01) |
| *A01B 69/00* | (2006.01) |
| *B60Q 1/48* | (2006.01) |
| *G05D 1/00* | (2006.01) |
| *B60S 9/22* | (2006.01) |

(52) U.S. Cl.
CPC ............... *B62D 12/02* (2013.01); *A01B 69/00* (2013.01); *B60S 9/22* (2013.01); *G05D 1/00* (2013.01); *B60Q 1/48* (2013.01)
USPC ............. 701/41; 701/36; 340/932.2; 180/204

(58) Field of Classification Search
CPC .............. G05D 1/00; G05D 1/12; G06F 7/00; A01B 69/00; A01B 69/04; B60S 9/22; B60Q 1/48; B62D 6/00; B62D 12/00; B62D 12/02
USPC ........... 701/1, 23, 41, 36; 180/204; 340/932.2
See application file for complete search history.

(56) References Cited

U.S. PATENT DOCUMENTS

| | | | |
|---|---|---|---|
| 3,605,088 A | 9/1971 | Savelli | |
| 4,763,916 A * | 8/1988 | Ratsko et al. | ................. 280/432 |
| 5,247,442 A | 9/1993 | Kendall et al. | |

(Continued)

FOREIGN PATENT DOCUMENTS

| | | |
|---|---|---|
| DE | 19526702 A1 * | 2/1997 |
| DE | 19806655 A1 | 8/1999 |

(Continued)

*Primary Examiner* — Joseph M Rocca
*Assistant Examiner* — Daniel Yeagley
(74) *Attorney, Agent, or Firm* — Novak Druce Connolly Bove + Quigg LLP

(57) ABSTRACT

The invention relates to a drive assisting method for the reversal path of a vehicle which consists of a tow track and a trailer pivotable with respect thereto and is provided with a conventional mechanical steering device. The inventive method consists in selecting a target point (C), which the vehicle path should pass through, Determination in calculating the steering angle instruction $\beta_0$ according to said target point (C) and the vehicle geometry and in displaying said steering angle instruction $\beta_0$ in comparison with an actual steering angle $\beta$, which corresponds to the position of the member (21) of the steering device, on a display device accessible to a driver.

12 Claims, 5 Drawing Sheets

(56) References Cited

U.S. PATENT DOCUMENTS

| | | | |
|---|---|---|---|
| 6,223,114 B1 | 4/2001 | Boros et al. | |
| 6,273,446 B1 | 8/2001 | Paul | |
| 6,292,094 B1 | 9/2001 | Deng et al. | |
| 6,366,221 B1 | 4/2002 | Lisaka et al. | |
| 6,494,476 B2 | 12/2002 | Masters et al. | |
| 6,564,122 B1 | 5/2003 | Huertgen et al. | |
| 6,732,024 B2* | 5/2004 | Rekow et al. | 701/26 |
| 6,854,557 B1 | 2/2005 | Deng et al. | |
| 6,959,970 B2* | 11/2005 | Tseng | 303/146 |
| 7,088,262 B2* | 8/2006 | Schindler et al. | 340/932.2 |
| 7,225,891 B2* | 6/2007 | Gehring et al. | 180/14.2 |
| 7,715,953 B2* | 5/2010 | Shepard | 701/1 |
| 8,036,792 B2 | 10/2011 | Dechamp | |
| 2001/0018630 A1 | 8/2001 | Wetzel et al. | |
| 2002/0069006 A1 | 6/2002 | Faye et al. | |
| 2002/0180178 A1 | 12/2002 | Masters et al. | |
| 2004/0080209 A1 | 4/2004 | Leimbach et al. | |
| 2005/0000738 A1 | 1/2005 | Gehring et al. | |
| 2007/0051547 A1* | 3/2007 | Fischer et al. | 180/204 |

FOREIGN PATENT DOCUMENTS

| | | |
|---|---|---|
| DE | 10142367 A1 | 3/2003 |
| GB | 2398050 A | 8/2004 |
| JP | 10001063 A * | 1/1998 |
| WO | 9621582 A1 | 7/1996 |
| WO | 2004022413 A1 | 3/2004 |

* cited by examiner

DRIVE ASSISTING METHOD FOR REVERSAL PATH WITH DRAWN VEHICLE

TECHNICAL FIELD

The invention relates to a method for assisting with driving a vehicle, particularly an industrial vehicle of the truck type. It relates more specifically to coupled vehicles comprising an articulation between a tractor and a trailer. This may therefore be a vehicle of the semitrailer type in which the semitrailer is articulated to a tractor at a fifth wheel. This may also be a coupling involving a truck of the type that carries a payload, behind which a trailer is articulated.

The invention relates more specifically to assistance with controlling the steering of vehicles comprising a conventional steering system in which a command from the steering wheel or, more generally, from a steering control member, is transmitted mechanically.

The invention therefore more specifically relates to a method of assistance intended to facilitate the work of the driver during backing-up maneuvers. The problem is that, given the articulation between the tractor and the trailer, backing-up maneuvers that are not in a straight line require operations of applying steering lock and opposite lock to be strung together in an appropriate sequence.

PRIOR ART

As already mentioned, backing-up maneuvers, for example when coming up alongside a platform or parking, require a certain amount of skill on the part of the driver given the articulation between the two parts of the vehicle. This skill is all the more necessary given that the direct field of view of the driver is relatively limited, if not non-existent because the rear view mirrors are mounted on the tractor vehicle and are unable to provide a view of the space behind the trailer when this trailer is not perfectly aligned with the tractor.

To make backing-up maneuvers easier in various vehicles there are solutions that have already been proposed and that employ an image acquisition device situated at the rear of the vehicle and providing a view of the space behind the trailer. Systems such as these have been described in particular in documents DE 101 42 367, U.S. Pat. Nos. 6,366,221, 6,564,122 and WO 2004/022413.

These devices make backing-up maneuvers easier but are still more particularly suited to vehicles of the type that carry a payload. This is because with coupled vehicles there is still the need for the driver to string together the operations of applying steering lock and opposite lock appropriately in order to perform the backing-up maneuvers.

Elsewhere, document U.S. Pat. No. 3,605,088 describes a device installed in the cab of a coupled vehicle. This device is interfaced with linkage mechanisms making it possible to detect situations which the coupling is in extreme angular positions relative to the tractor. In this case, the driver is informed through a luminous display of the need to apply steering lock or opposite lock. A device such as this prevents the tractor from striking the coupling in a configuration known as "jack-knifing". In other words, this device does not provide assistance for the whole of the backing-up maneuver but merely generates alerts in extreme angular situations. Another device for preventing jack-knifing is described in document U.S. Pat. No. 6,292,094.

To make backing-up maneuvers easier it is also known, from document WO 96/21582, for the driver to be informed of the distance separating the rear of his vehicle from the various obstacles there are. A similar device has been described in document U.S. Pat. No. 6,564,122 in which an in-cab display detects whether the current path being followed carries a risk of meeting with an obstacle located behind the vehicle.

All of these devices provide the driver with a certain amount of assistance, but the driver nonetheless still has to decide when to apply steering lock and opposite lock in order to achieve the desired backing-up maneuver.

Furthermore, the driver's points of reference may change from one truck to another according to the wheelbase of the tractor, the location of the point of articulation, and the length of the trailer. It will therefore be appreciated that there is indeed some benefit to be derived in affording the driver assistance throughout the backing-up maneuver, and to do so according to characteristics specific to the vehicle.

SUMMARY OF THE INVENTION

It is an objective of the invention to make backing-up maneuvers in articulated vehicles easier. The invention therefore relates more specifically to a method for assisting with driving, for backing-up maneuvers of a coupled vehicle comprising a tractor and a trailer that is articulated with respect to the tractor. This method relates to vehicles equipped with a conventional steering device in which the steering angle of the steered wheels is an image of the position of a steering control member moved by the driver.

According to the invention, during the backing-up maneuvers:
- a target point through which the path of the vehicle is to pass is selected;
- a steering angle setpoint value is calculated as a function of said target point and of the geometry of the vehicle;
- said steering angle setpoint value is displayed, on a display device accessible to the driver, in comparison with the actual steering angle value that corresponds to the position of the steering control member.

In other words, the invention consists in contriving for the driver to be constantly informed, throughout the backing-up maneuvers, of the ideal steering angle that he needs to apply to the steering wheel, and therefore to the steered wheels, in order to bring the vehicle into the position he has selected beforehand. Thus, an appropriate computer determines the desirable variation in steering angle so as to keep the coupling in a configuration that will allow the aim point to be reached.

The driver is thus assisted in the input that he has to apply to the steering wheel in order to string together the operations of applying steering lock and opposite lock so that the aim point is reached at the end of the maneuver.

In practice, the target point can be selected in different ways.

Thus, in a first alternative form, the selection of the target point may be displayed in the cab, on a display screen that provides a view of the field behind the vehicle. In this case, the target point may be selected using an aiming system that can be actuated by the driver, interfaced with a display screen for viewing the field of view behind the vehicle. Actual selection of the target point may be performed by action on an appropriate member, using a sighting mark present on the screen, that the driver can move about at will, then fix in position. It is also possible for the driver to cause the position of the target point to move by acting on this sighting mark while performing the assisted backing-up maneuver. Because the position of the target point is stored in memory it may potentially be updated on the display screen through a recalculation that takes account of the movement of the vehicle and therefore the change in the rear field of vision.

In another alternative form, the target point may be selected automatically by choosing a maneuver that is to be performed. More specifically, when the vehicle is in a position close to parking areas, it is possible to offer the driver a choice of various maneuvers, such as performing a parallel parking maneuver, parking at a predetermined angle, or parking by turning through 90° to the left or to the right. Once the driver has selected the maneuver that he wishes to perform, the optimum steering angle is then displayed on the display device, as a function of the selected maneuver.

In practice, the steering angle setpoint value may be displayed in the form of an angular range within which the actual steering angle needs ideally to remain.

In practice, at the time that it is selected, the selected target point may lie a predetermined distance behind the trailer. Thus, the target point can be detected by its coordinates in a frame of reference associated with the trailer, one axis of which frame of reference corresponds to the longitudinal axis of the trailer. In such a case, the target point has one coordinate fixed in this frame of reference and can deviate laterally from the axis of the trailer.

In practice, calculating the steering angle setpoint value involves a number of steps during which:
- a first setpoint angle value is calculated for the angle between the axes of the trailer and of the tractor as a function of the target point and of the geometry of the vehicle;
- the steering angle setpoint value is then calculated as the result of feedback control that causes the measured angle between the axes of the trailer and of the tractor to tend toward the first angular setpoint value.

In other words, the method consists in determining, in a given position, the optimum angle between the tractor and the trailer that will allow the aim point to be reached. The steering angle is then calculated such that the articulation of the coupling will be deformed in such a way as to cause this angle between the tractor and the trailer to tend toward this optimal angle.

In practice, the steering angle setpoint value may take account of various components which advantageously can be combined.

Thus, a first component of the steering angle setpoint value is a function of the radius of curvature of the path of the point at which the trailer is articulated to the tractor. This radius of curvature is determined with respect to the geometry of the vehicle and, in particular, with respect to the position of the fixed rear axle of the trailer and the position of the aim point.

Control of the steering angle may incorporate a second component which can be obtained as a function, particularly using proportional integral derivative processing, of the difference between the measured angle between the axes of the tractor and of the trailer and the first setpoint angle identified previously.

In practice, the steering angle setpoint value may include an additional component which is taken into consideration when the angle between the axes of the tractor and of the trailer crosses a predetermined threshold in order to reduce this angle. It is in fact important for the steering control not to lead to a situation in which the angle between the trailer and the tractor would cause the coupling to jack-knife.

The driver may be additionally assisted by additional displays which keep him informed as to how best to perform the maneuver. Thus, it may be advantageous for the driver to have available to him an indication of the remaining distance to be covered as far as the target point, so that he can limit his speed as he nears his objective.

It is also possible to assist the driver by providing him with calculated indication of a recommended maximum speed at which to perform the backing-up maneuvers. This calculation takes into consideration the distance yet to be covered before the target point is reached. It is also possible for the maneuver to be broken down into several phases requiring steering lock and opposite lock to be applied in sequence. Insofar as particular points in the path such as those at which the steering angle setpoint value changes more rapidly are determined, it is advantageous for the driver to be informed of the distance remaining to be covered before reaching each of these particular points to prevent him from reaching them at excessive speed. It is also possible to indicate a maximum recommended speed calculated as a function of this remaining distance.

BRIEF DESCRIPTION OF THE DRAWINGS

The embodiment of the invention and the ensuing advantages will become clearly apparent from the description of the embodiment which follows, with the support of the attached figures in which.

EMBODIMENT OF THE INVENTION

Figure 1:
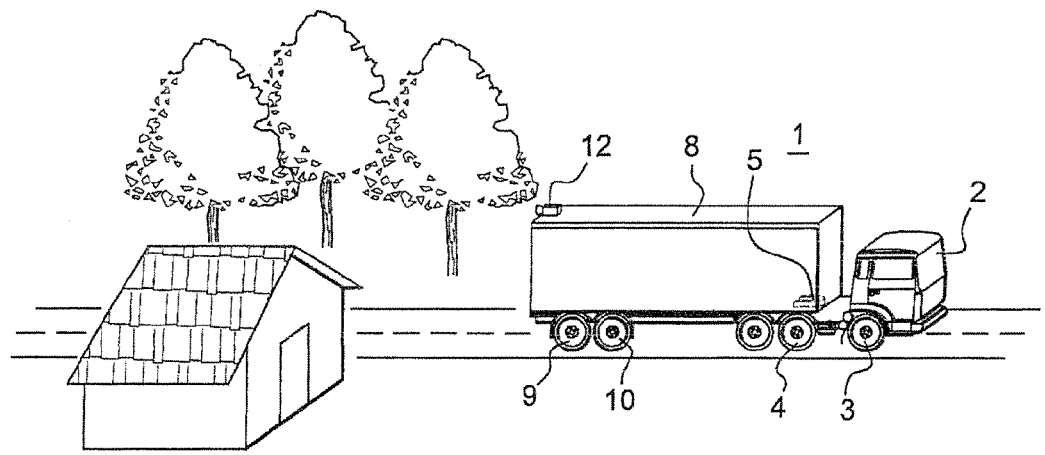
FIG. 1 is a brief perspective view of a truck moving around in an environment in which the invention can be implemented.

As already mentioned, the invention relates to a method for controlling the steering angle of the steered wheels of an articulated vehicle, as illustrated in FIG. 1. A vehicle 1 such as this therefore comprises a tractor 2 comprising two axles 3, 4 and a fifth wheel 5 to which the point of attachment of a trailer 8 is articulated. This trailer 8 at the rear comprises two axles 9, 10 and an image acquisition device 12 depicted schematically on the upper wall of the trailer 8.

Figure 2:
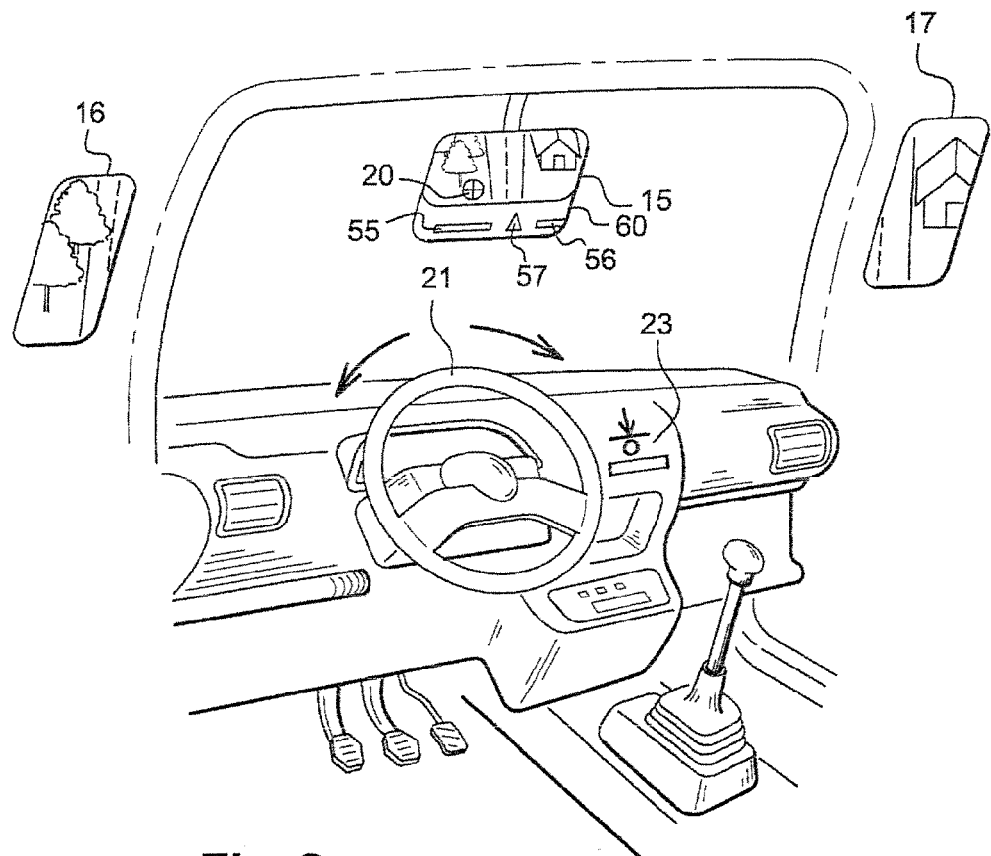
FIG. 2 is a brief perspective view of the interior of a cab of a vehicle implementing the method according to the invention.

As illustrated in FIG. 2, this image acquisition device 12 allows the rear field of view of the vehicle to be displayed on a screen 15 present near the steering wheel 21. In FIG. 2, this screen 15 is positioned in the middle at the top of the windshield, but it goes without saying that it could be positioned at some other location, without departing from the scope of the invention.

Thus, in combination with the two, left and right, rear-view mirrors 16, 17, the driver has available to him various complementing fields of view which do not necessarily overlap if the trailer and the tractor are not aligned.

According to the invention, the driver can select a target point through which he wishes the path of his vehicle to pass, while backing up. FIG. 2 illustrates an example in which this selection is made via the screen 15 that displays the field of view at the back. More specifically, before beginning the backing-up maneuver and for example therefore before engaging a reverse gear, the driver can switch to target-selection mode by moving a sighting mark 20 over the screen 15 using a device, of the appropriate knob or lever 23 type. Moving this device move the sighting mark 20 around over the screen 15. When the sighting mark 20 coincides with the target point at which the driver is aiming, the driver validates this position and this initiates the calculation characteristic of the invention. The driver can constantly move the target by action on the knob 23, and by validating this new target.

Figure 3:
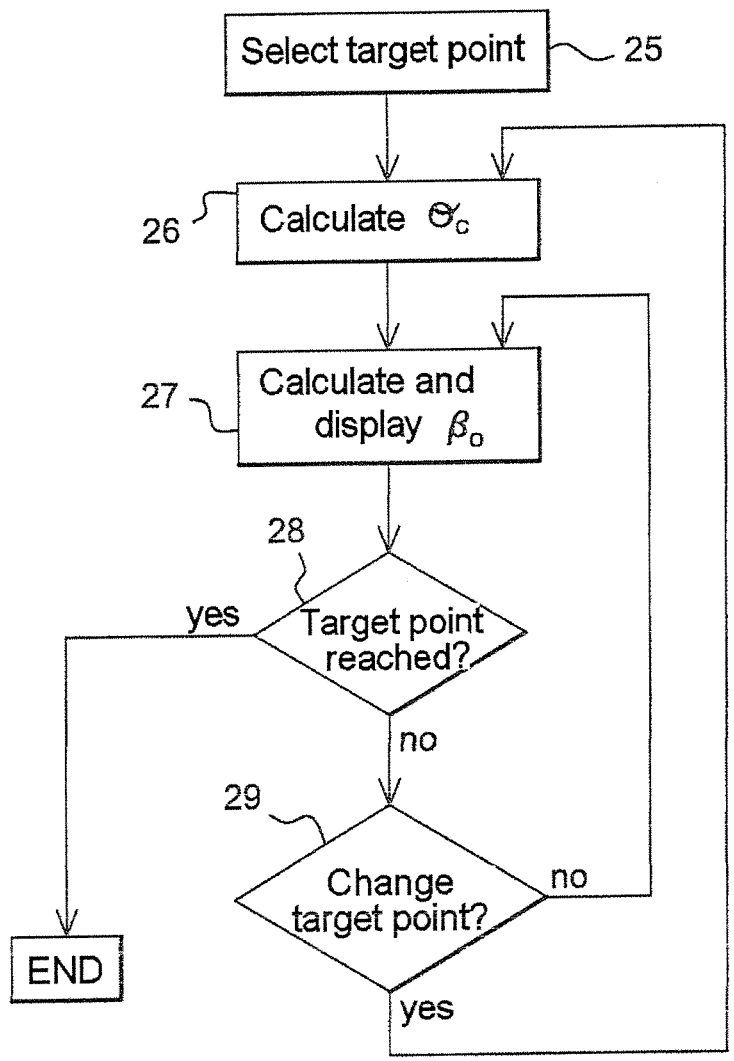
FIG. 3 is a flow diagram schematically showing how the steps of the invention are strung together.

As illustrated in FIG. 3, the method according to the invention therefore involves a first step 25 during which the driver selects the target point through which the path of the vehicle is to pass. Next, once this selection has been made, the method continues with a step 26 of calculating the angle $\theta_c$ corresponding to the ideal angle that the axis of the tractor needs to adopt with respect to the axis of the trailer. This first calculation, in a step 27, leads to calculation of the steering angle setpoint value $\beta_0$ which is then displayed for the attention of the driver. This method continues as long as the target point is not reached, the check on this being performed in step 28.

If the driver does not alter the target point, according to the test at 29, then the method continues, without a break, with calculation 27 of the steering angle setpoint value $\beta_0$. What actually happens is that because of the dynamics of the vehicle, the steering maneuvers will mechanically cause the angle $\theta$ of the articulation between the tractor and the trailer to change, and this factor is fed into the calculation of the setpoint value $\beta_0$ in the way explained hereinafter.

By contrast, if the driver does change his selection of target point, for example by action on the knob 23 (FIG. 2) and by validating this new target, then a new calculation 26 of the angle $\theta_c$ is performed and the method continues with a new calculation of the steering angle setpoint value $\beta_0$ in step 27.

It is also possible, in unillustrated alternative forms of embodiment, to select the maneuver that is to be performed and therefore a target point by choosing a maneuver of the parallel parking type, pulling over to the right or to the left for example.

In practice, the various steps of the method, and especially the various calculations and feedback control operations can be performed by one or more on-board computers, by virtue of hardware and/or software facilities programmed to do so.

Figure 4:
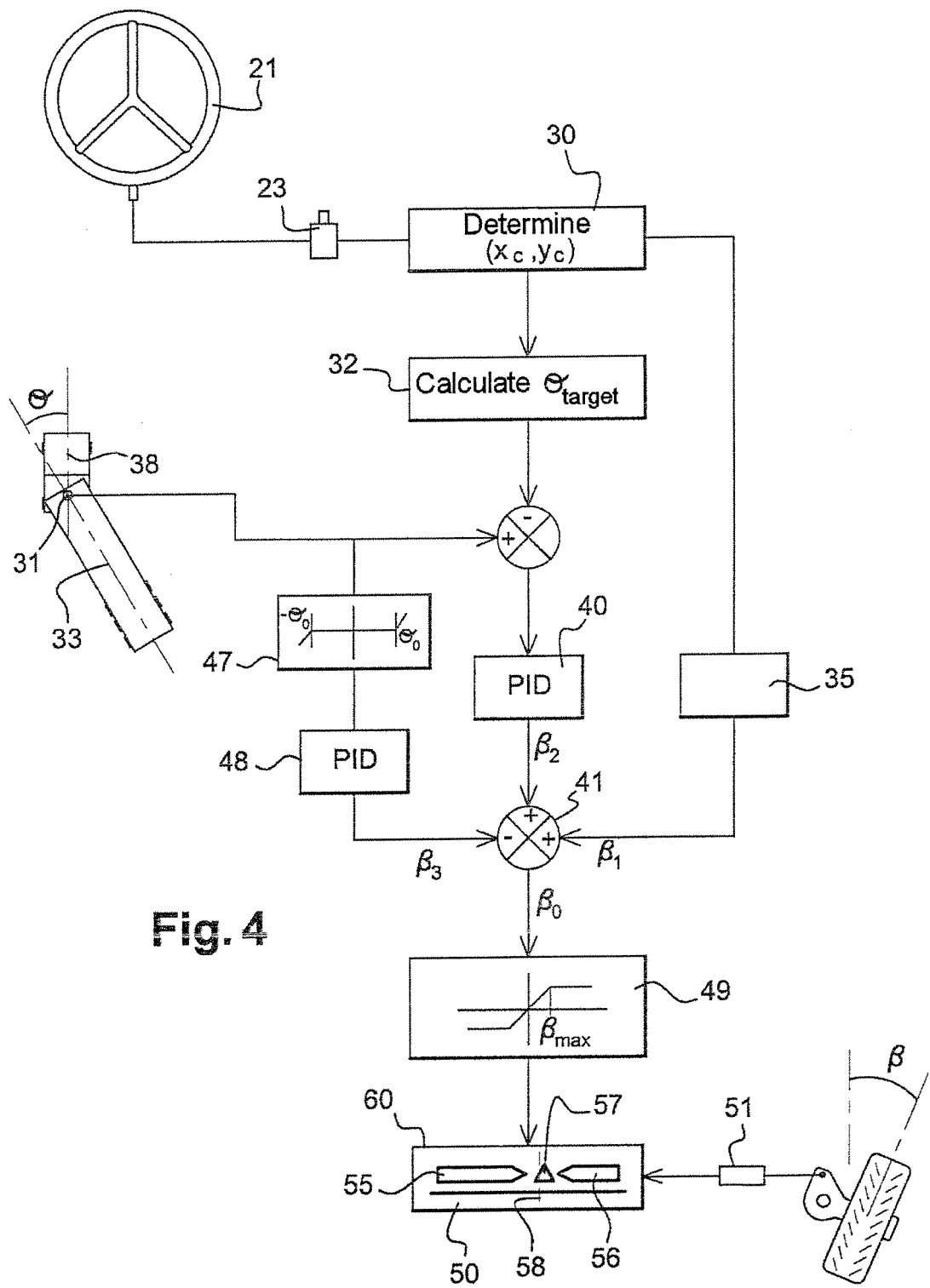
FIG. 4 is a simplified diagram showing how the various steps of the invention work.
Figure 5:
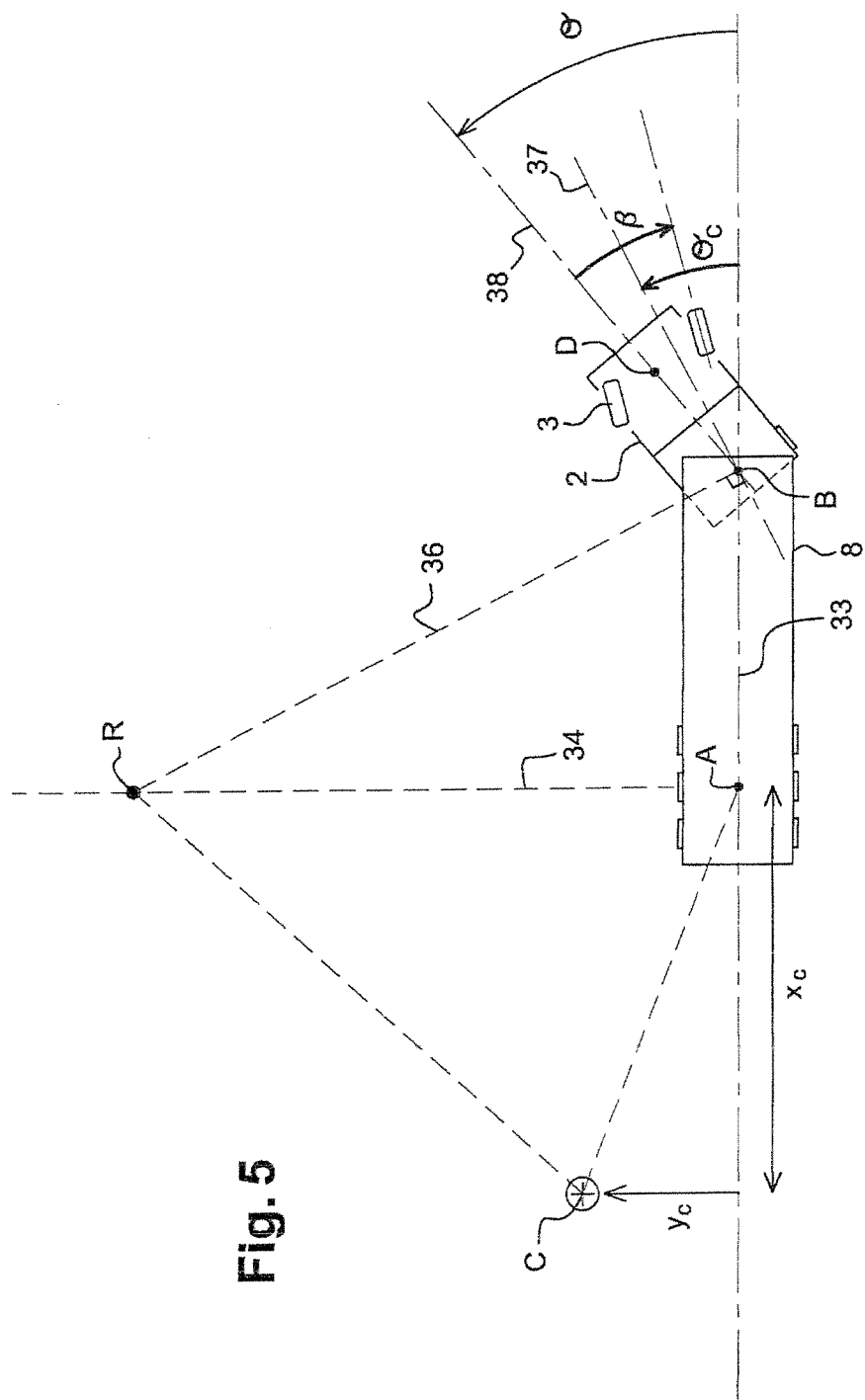
FIG. 5 is a schematic plan view of a truck depicting the various angles and distances used in implementing the invention.

The way in which the method is run is shown in detail in FIG. 4 in combination with FIG. 5 which depicts the points and the axes characteristic of the method. Thus, once the driver has fixed the position of the target point C visible in FIG. 5 and has validated it by acting for example on the appropriate member 23, the method according to the invention is initiated by determining at 30 target aim point C, which consists in converting the position of the sighting mark 20 present on the screen 15 into target point coordinates. This determining is done by calculating the coordinates $x_c$, $y_c$ of this point C in a frame of reference based on the point A, situated in vertical alignment with the fixed rear axle of the trailer. When the trailer has several fixed rear axles, this point A is situated midway between the axles. The characteristic frame of reference is therefore formed by the axis 33 of the trailer and a perpendicular axis 34 passing through the point A. It is assumed at the time of selection that the target point C lies at a coordinate $x_c$ along the axis 33 that adopts a predetermined value which can range up to about a few tens of meters. The target point can deviate laterally from the axis 33 of the trailer. The position of the sighting mark 20 on the screen therefore corresponds to a lateral deviation of the sighting mark with respect to the axis 33 of the trailer, which deviation is converted into the coordinate $y_c$ along the axis 34 of the frame of reference. This being the case, moving the sighting mark 20 in just a horizontal direction is enough to determine the position of the target point C.

Thus, it is possible to calculate the position of the ideal center of rotation R situated at equal distances from the aim point C and from the point A, located at the rear axle, this center of rotation R being aligned with the axis 34 passing through the rear axle. Because this axis is perpendicular to the axis 33 of the trailer, the point R is thus clearly defined.

This center of rotation R makes it possible to determine the line along which the thrust exerted by the tractor needs ideally to be applied to the point B at which the trailer is articulated to the tractor. This thrust needs ideally to be exerted along a line 37 which is perpendicular to the straight line 36 connecting the center of rotation R to the point of articulation B.

Thus, in step 32, it is possible to determine the value of the angle $\theta_c$ corresponding to the ideal angle that the axis 38 of the tractor 2 needs to adopt with respect to the axis 33 of the trailer 8. In numerical terms, and by applying basic geometric principles, this setpoint angle has the value $$\theta = \tan^{-1}\left(\frac{AB}{\frac{y_c}{2} + \frac{x_c^2}{2y_c}}\right),$$

where $x_c$, $y_c$ are the coordinates of the target point C in the frame of reference mentioned earlier.

An angle sensor 31 positioned at the articulation point B can be used to measure the actual measured angle $\theta$ between the axis 33 of the trailer and the axis 38 of the tractor.

According to the invention, the feedback control used to calculate the steering angle setpoint value $\beta_0$ takes account of several components that can be combined.

Figure 6:
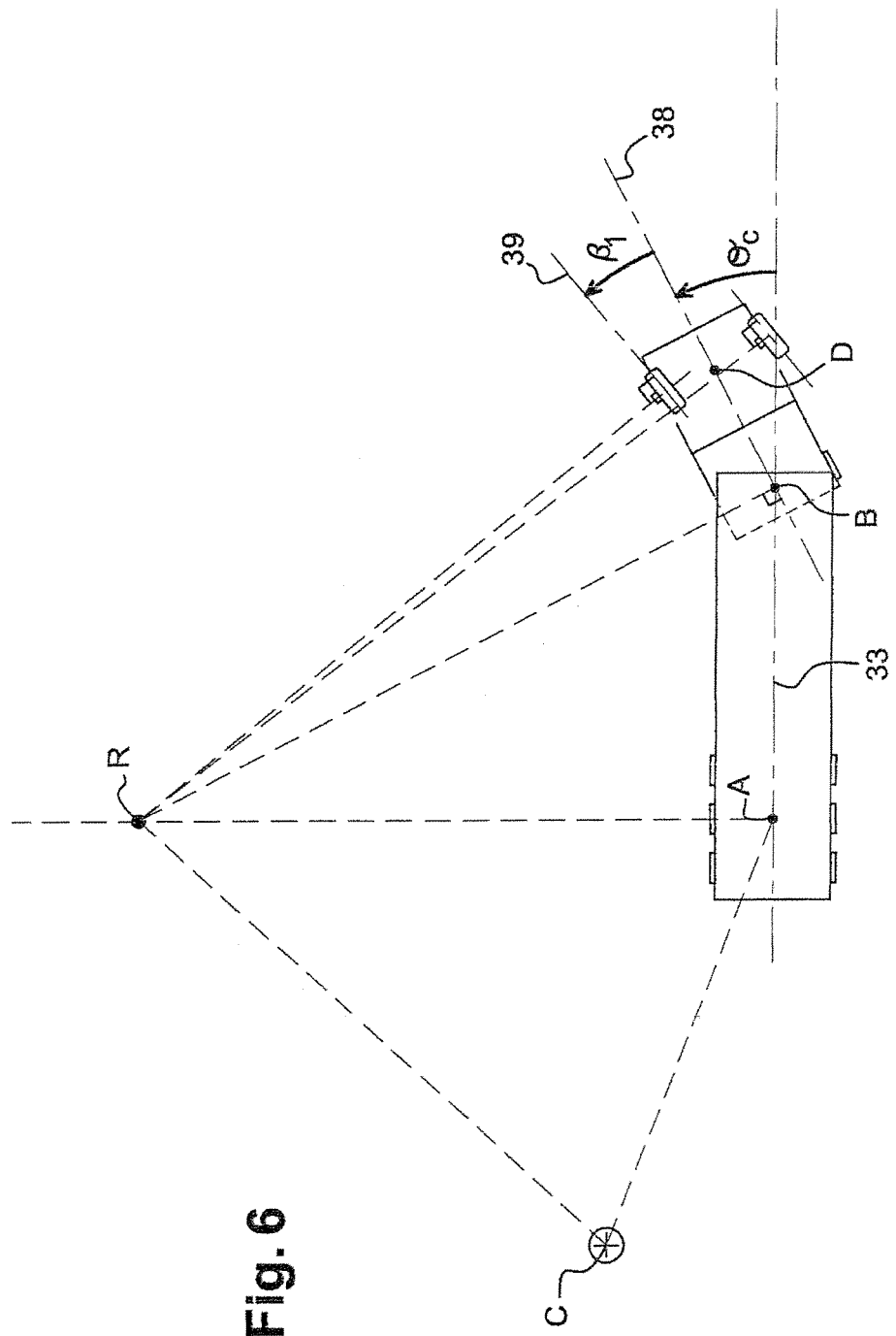
FIG. 6 is a view similar to FIG. 5, showing the truck in a particular configuration.

A first component can be calculated, in step 35, from the position of the point of rotation R combined with the geometry of the vehicle and more specifically of the tractor. This first component $\beta_1$ is aimed at directing the steered wheels optimally when the angle between the axis 38 of the tractor and the axis 33 of the trailer reaches the abovementioned setpoint angle value for $\theta_c$. This configuration, which is illustrated in FIG. 6, is such that the planes 39 of the wheels are substantially tangential to circles of center R. This first component $\beta_1$ is therefore dominant when the tractor and the trailer are at an angle to one another that is close to the value $\theta_c$, and therefore in particular toward the end of the maneuver.

By taking account of approximations regarding the parallelism of the steered wheels, the first component $\beta_1$ can be calculated as follows:

$$\beta_1 = \tan^{-1}\left(\frac{DB}{RB}\right),$$

in which BD is the distance separating the point of articulation B from the point D situated at the steered axle of the tractor, and RB is the distance separating the ideal point of rotation R from the point B at which the trailer is articulated to the tractor, namely, by applying basic geometric principles, $$RB = \sqrt{\left(\frac{y_c}{2} + \frac{x_c^2}{2y_c}\right)^2 + AB^2}.$$

Calculation of the steering angle setpoint value $\beta_0$ takes account of a second component $\beta_2$ resulting from a processing of the difference between the actual angle $\theta$ and the setpoint angle $\theta_c$. The purpose of this second component is to allow the vehicle to attain the path in which the angle between the tractor and the trailer has reached the setpoint value $\theta_c$. It is therefore predominant at the start of the maneuver when the coupling is in a configuration far removed from the configuration which should ideally lead to the target point and which is illustrated in FIG. 6. The difference $(\theta-\theta_c)$ can be filtered by a PID regulator 40 to give rise to the second component $\beta_2$ used to determine the steering angle setpoint value $\beta_0$ using the following equation:

$$\beta_2 = k_2 \cdot (\theta - \theta_c) + k_3 \cdot \frac{d(\theta - \theta_c)}{dt}.$$

In practice, the coefficient $k_2$ is determined as a function of the combined wheelbase of the trailer and of the tractor. In order to avoid the need to apply opposite lock excessively swiftly, it is necessary for this coefficient not to be too high. However, it needs to be high enough that it allows the vehicle to attain the desired path as quickly as possible. The coefficient $k_3$ for the PID regulator 40 provides a damping function and limits the rate of variation of the steering angle setpoint value $\beta_0$ when the rate of variation of the angle $\theta$ is too great. These coefficients may also be dependent on a possible limitation of the speed of the vehicle, employed when backing up. This is because if the speed is limited, the risks of jack-knifing are lower, and it is then possible to use higher coefficients for the PID 40, giving rise to a more responsive correction.

This second component $\beta_2$ is added to the first component $\beta_1$ in the summer 41. These two components are important in providing the driver with a setpoint value that will allow him to reach the target point as quickly as possible.

Furthermore, to prevent the truck from jack-knifing if the angle $\theta$ becomes too great, a third component $\beta_3$ is calculated. This component is taken into consideration at 47 only when the angle $\theta$ exceeds a predetermined value $\theta_0$ beyond which this risk exists. When this risk is present, this component $\beta_3$ takes dominance over the first $\beta_1$ and second $\beta_2$ components mentioned hereinabove. This is because its prime objective is to prevent the tractor from striking the trailer, by injecting an opposite lock component into the steering angle setpoint value $\beta_0$, the purpose of this opposite lock component being quickly to oppose the excessive increase in the angle $\theta$, in terms of absolute value. It will, however, be noted that this third component is an optional aspect of the invention insofar as its purpose is automatically to monitor the onset of potential jack-knifing situations, which monitoring could be performed by the driver himself. In other words, the invention covers alternative forms of embodiment in which this third component is not calculated.

This component $\beta_3$, following filtering by a PID controller 48, is subtracted from the sum of the other two components $\beta_1$, $\beta_2$ to give the steering angle setpoint value $\beta_0$.

Thereafter, this sum $\beta_0$ is saturated at 49 to prevent the maximum steering angle $\beta_{max}$ authorized by the steering system from being exceeded. This setpoint angle value $\beta_0$ is then displayed in the cab, for example in a zone 60 of the rear view display screen 15 or alternatively on some other appropriate device. This setpoint value $\beta_0$ is represented by an angular range centered on $\beta_0$ and within which the driver should ideally keep the actual steering angle $\beta$. The actual steering angle $\beta$, which is measured using the sensor 51, is also displayed by a slider 57 moving along the axis on which the limits 55, 56 of the range situated on each side of the position 58 of the steering angle setpoint value $\beta_0$ are represented.

In addition, the method according to the invention can determine a maximum speed that should not be exceeded in order to avoid the risks of the coupling jack-knifing. This maximum speed may be displayed on the display screen or on any other appropriate device. This speed may also be used to limit the action of the throttle pedal and thus prevent this maximum speed from being exceeded.

It is evident from the foregoing that the method according to the invention makes it easier to perform the operations of backing up an articulated vehicle in which rear visibility is non-existent, and the maneuvering of which is a complicated matter.

The invention claimed is:

1. A method for assisting with backing-up maneuvers of a vehicle comprising a tractor and a trailer that is articulated with respect to said tractor, said vehicle being equipped with a steering assist device in which a steering angle of steered wheels of said vehicle is displayed on a display device as a position within a displayed range of steering angle positions within which said steering angle should be maintained, the method comprising:
   in response to selection of a target point (C) through which a path of the vehicle is to pass during said backing-up maneuvers, calculating a steering angle setpoint value ($\beta_0$) as a function of said target point (C) and of a geometry of the tractor and trailer of the vehicle; and
   displaying said steering angle setpoint value ($\beta_0$) on said display device accessible to the driver of the vehicle, in comparison with said display of an actual steering angle value ($\beta$) that corresponds to the position of the steered wheels with respect to a central axis of the vehicle.

2. The method as claimed in claim 1, wherein the target point (C) is selected using an aiming system that can be actuated by the driver, interfaced with said display device for viewing a field of view behind the vehicle.

3. The method as claimed in claim 1, wherein the target point (C) is selected automatically by choosing a maneuver that is to be performed.

4. The method as claimed in claim 1, wherein the steering angle setpoint value ($\beta_0$) is displayed in a form of a range of values.

5. The method as claimed in claim 1, wherein calculating the steering angle setpoint value ($\beta_0$) comprises:
   calculating a first setpoint angle value ($\theta_c$) for a measured angle ($\theta$) between a central axis of the trailer and said central axis of the tractor as a function of the target point (C) and of the geometry of the vehicle; and
   updating the steering angle setpoint value ($\beta_0$) as a result of feedback control during said backing-up maneuver so that the measured angle ($\theta$) tends toward said first setpoint angle value ($\theta_c$).

6. The method as claimed in claim 5, wherein calculating the steering angle setpoint value ($\beta_0$) is also a function of a component ($\beta_1$) determined as an optimal steering angle when the measured angle ($\theta$) between the axis of the trailer and the axis of the tractor is equal to the calculated first setpoint angle value ($\theta_c$).

7. The method as claimed in claim 5, wherein calculating the steering angle setpoint value ($\beta_0$) is also a function of a component ($\beta_2$) that is a function of a difference between the measured angle ($\theta$) and said first setpoint angle value ($\theta_c$).

8. The method as claimed in claim 5, wherein calculating the steering angle setpoint value ($\beta_0$) is also a function of a component ($\beta_3$) evaluated when the measured angle ($\theta$) between the axis of the trailer and the axis of the tractor exceeds a predetermined threshold value for said calculated first setpoint angle value and acts to reduce said measured angle ($\theta$) between the axis of the trailer and the axis of the tractor.

9. The method as claimed in claim 1, wherein the setpoint value ($\beta_0$) is represented by an angular range within which said steering angle should be maintained.

10. The method as claimed in claim 9, wherein said angular range is centered on the steering angle setpoint value ($\beta_0$).

11. The method as claimed in claim 1, wherein the setpoint value ($\beta_0$) is displayed on said display device together with a display of a field of view behind said vehicle.

12. The method as claimed in claim 1, wherein the actual steering angle value ($\beta$) is represented on the display device by a slider icon on a representation of steering angle range limits.

* * * * *